(12) United States Patent
Franchet et al.

(10) Patent No.: US 6,914,344 B2
(45) Date of Patent: Jul. 5, 2005

(54) INTEGRATED STARTER/GENERATOR FOR A TURBOMACHINE

(75) Inventors: Michel Franchet, Pouilly le Fort (FR); Jean-Louis Picard, Vaux le Penil (FR)

(73) Assignee: Snecma Moteurs, Paris (FR)

( * ) Notice: Subject to any disclaimer, the term of this patent is extended or adjusted under 35 U.S.C. 154(b) by 169 days.

(21) Appl. No.: 10/619,076

(22) Filed: Jul. 15, 2003

(65) Prior Publication Data
US 2004/0070211 A1 Apr. 15, 2004

(30) Foreign Application Priority Data

Jul. 17, 2002 (FR) .............................. 02 09029

(51) Int. Cl.$^7$ ................................................ H02P 9/00
(52) U.S. Cl. ...................... 290/52; 290/40 C; 60/668
(58) Field of Search ................... 290/1 R, 1 A, 290/40 C, 52; 60/39.511, 668

(56) References Cited

U.S. PATENT DOCUMENTS

| | | | |
|---|---|---|---|
| 3,264,482 A | | 8/1966 | Clark et al. ................ 290/38 |
| 4,253,031 A | * | 2/1981 | Frister ........................ 290/52 |
| 5,088,286 A | * | 2/1992 | Muraji ....................... 60/608 |
| 5,309,029 A | * | 5/1994 | Gregory et al. ............ 290/1 R |
| 5,376,827 A | | 12/1994 | Hines .......................... 290/52 |
| 5,432,383 A | * | 7/1995 | Kawamura ................. 290/14 |
| 5,497,615 A | * | 3/1996 | Noe et al. ................ 60/39.511 |
| 5,831,341 A | * | 11/1998 | Selfors et al. ............... 290/52 |
| 6,294,842 B1 | * | 9/2001 | Skowronski ................. 290/7 |
| 6,495,929 B2 | * | 12/2002 | Bosley et al. ................ 290/52 |

FOREIGN PATENT DOCUMENTS

| | | |
|---|---|---|
| DE | 1803419 | 6/1969 |
| FR | 2.076.450 | 10/1971 |
| GB | 629775 | 9/1949 |
| GB | 1147730 | 4/1969 |

* cited by examiner

*Primary Examiner*—Nicholas Ponomarenko
(74) *Attorney, Agent, or Firm*—Oblon, Spivak, McClelland, Maier & Neustadt, P.C.

(57) ABSTRACT

The invention relates to a turbomachine of axis X including a compressor and an integrated starter/generator. The field magnetic circuit of the starter/generator is mounted in the bore of at least one disk of the compressor and surrounds the secondary magnetic circuit which is secured to a cylindrical shroud provided on the support structure for the bearing of the compressor. The invention applies in particular to single-shaft or multi-shaft turbomachines.

5 Claims, 5 Drawing Sheets

INTEGRATED STARTER/GENERATOR FOR A TURBOMACHINE

The invention relates to a turbomachine for use in aviation, and more particularly to a turbomachine including an integrated electricity generator coaxial with the axis of the turbomachine.

BACKGROUND OF THE INVENTION

In a conventional engine, the accessory housing fitted with fuel pumps, oil pumps for lubricating bearings, hydraulic pumps for controlling various members, electricity generators, and the starter, is placed outside the engine and receives power taken from the engine by means of a vertical shaft and angle gearing.

As time moves on, increasing compression ratios and turbine inlet temperatures, and also improvements in materials and in efficiency have led to the size of engines being constantly reduced so as to obtain ever greater thrust/weight ratios, and this applies both to civilian applications and to military applications.

The power takeoff system and the accessory housing have not been able to keep up with this progress and therefore represents an ever increasing proportion of the volume and the mass of engines, particularly low power engines that are of small size, and above all when the accessory housing, which is generally placed beneath or on the engine, and sometimes to one side of it, also contains an air starter and an electricity generator that are separate from each other.

The use of small engines, of ever-increasing simplicity and reduced cost, for propelling trainer airplanes, observation or attack drones, and cruise missiles, is requiring engine manufacturers to make these engines ever more furtive. This can only be achieved by greatly reducing the frontal area of the engine, which also achieves a significant reduction in drag that enables the range or duration of remote controlled aircraft fitted with such engines to be increased. In order to reduce the weight and the frontal area of such engines, it therefore appears desirable to consider integrating an electric generator/starter inside the engine and to eliminate the use of mechanical connections for the interface between the engine and the accessories, with said interface then being by way of electrical transmission.

On airliners, having electrical or electrohydraulic flight controls in ever increasing numbers, and also on radar, advance warning, or electronic surveillance airplanes, electricity requirements are large. The engines of such airplanes are fitted with auxiliary generators, thereby increasing the size of their auxiliary housings and also their weight. It is therefore advantageous to integrate an auxiliary generator in addition to the generator/starter in an engine having a high by-pass ratio so as to reduce the size and weight of angle takeoffs, or indeed to eliminate them, thus enabling the pod to be made narrower, by housing certain electrically-driven accessories in the pylon.

The state of the art is illustrated in particular by U.S. Pat. Nos. 3,859,785, 5,867,979, 3,264,482; and GB 1,147,730.

U.S. Pat. No. 3,859,785 relates to a single shaft turbomachine in which a bell fitted with permanent magnets forms the rotor of a generator and serves as a nut for the front bearing of the compressor shaft. The bell is disposed in the air inlet cone of the compressor. That solution presents the drawback of limiting the size of the electricity generator because of the small diameters of the shaft and the inlet cone. The compressor must be rotating at very high speed in order to deliver significant power from such a small unit.

U.S. Pat. No. 5,867,979 relates to a high by-pass ratio turbomachine having three shafts. In its FIG. 1, that document shows a main electricity generator disposed coaxially in the rear cone of the low pressure turbine, i.e. in a hot zone, and auxiliary generators disposed in the engine casing and driven by angle gearing and transverse shafts, the auxiliary generators receiving power respectively from the high pressure shaft and from the intermediate shaft. That document describes a second embodiment, shown in its FIGS. 2 and 3, in which the front and rear bearings of the shafts are of the electromagnetic type and have integral electricity generators. Because those generators are integrated on the shafts, they are small in size and they must rotate at high speed in order to deliver significant amounts of power from such a small volume. In addition, the generators integrated on the rear bearings are disposed in hot zones.

U.S. Pat. No. 3,264,482 shows a double-flow two-shaft turbomachine including a generator/starter interposed between a stationary disk and the support bearing for the compressor rotor on the drive shaft of the fan.

The field magnetic circuit is mounted at the periphery of a disk of the rotor surrounding a sleeve provided at the front of the compressor rotor, and the support via the inter-shaft bearing, and the secondary magnetic circuit is mounted inside the engine casing. The disk of the generator/starter rotor is bulky and leads to a considerable increase in weight.

GB 1 147 730 shows the state of the prior art closest to the invention, since its FIG. 3 shows an electric starter whose field magnetic circuit is mounted in the bore of a bladed disk 32 of a compressor rotor and surrounds the secondary magnetic circuit which is secured to the stator of the compressor, without excessive increase in weight, said starter also being capable of being used as an electricity generator.

OBJECT AND SUMMARY OF THE INVENTION

Starting from that state of the art, the object of the invention is to propose a turbomachine having at least one integrated electricity generator that is capable of producing a high level of power at low speed.

According to the invention, this object is achieved by integrating the generator in a cold zone of diameter considerably greater than that of a shaft or a shaft bearing of said turbomachine, and in a zone that makes it possible to provide a greater axial extent for the airgap.

The invention thus provides a turbomachine comprising a combustion chamber and a high pressure shaft, said shaft presenting upstream from said chamber an axial compressor of axis X for delivering air to said chamber, and downstream from said chamber, a turbine receiving hot gas from said chamber for rotating the rotor of said compressor, said compressor having a plurality of compression stages, each stage presenting a ring of stationary blades secured to a casing and a ring of moving blades projecting radially from the periphery of a disk of said rotor, said turbomachine further comprising an electricity generator coaxial with said body and having a field magnetic circuit constrained to rotate with said rotor and a secondary magnetic circuit secured to said casing, the field magnetic circuit being mounted in the bore of at least one disk of said compressor and surrounding the secondary magnetic circuit, and the generator being configured to operate as a starter.

In a first embodiment of the invention, the compressor includes at least one disk carrying moving blades of large chord, and the field magnetic circuit is mounted in the bore of said disk.

In a second embodiment of the invention, the field magnetic circuit is mounted in the bore of disks of two consecutive stages of the compressor.

As a result, the axial extent of the airgap is increased.

This solution is applicable to single-shaft turbomachines and also to two- or three-shaft turbomachines.

For a single-shaft turbomachine with an inlet casing, the generator is integrated upstream from the compressor, i.e. in the bore of the disks closest to the inlet casing supporting the secondary magnetic circuit, at the first stage, advantageously a one-piece bladed disk.

With a single-shaft turbomachine having no inlet casing, the generator is integrated downstream from the compressor, i.e. in the bore of the disks closest to the intermediate casing supporting the secondary magnetic circuit.

In a turbomachine having two or three shafts, the generator is still integrated upstream from the high pressure compressor, i.e. in the bore of the disk(s), closest to the intermediate casing, advantageously single-piece bladed rings or disks.

When the turbomachine is a two-shaft machine further comprising a low pressure shaft having a low pressure compressor disposed upstream from the high pressure shaft, and a low pressure turbine disposed downstream from the high pressure shaft for the purpose of rotating the rotor of said low pressure compressor, said compressor comprising a plurality of compression stages, each presenting a ring of fixed blades and a ring of moving blades extending radially at the periphery of a disk of said rotor, it is also advantageous to fit said turbomachine with an auxiliary electricity generator whose field magnetic circuit is mounted in the bore of at least one disk of the low pressure compressor.

The dispositions of the invention make it possible to envisage providing an aviation turbomachine in which the accessories are driven by electric motors powered by the electricity generators of the invention, and thus to eliminate the mechanical connections and the angle takeoffs, thereby reducing the weight of the engine and narrowing down the pod of a turbojet having a large by-pass ratio.

It is also very advantageous to minimize the mass of the accessory casing on large engines since that makes it possible to reduce vertical loads in the event of a high degree of unbalance due to losing a fan blade, and it makes it possible to obtain an intermediate casing of reduced weight.

BRIEF DESCRIPTION OF THE DRAWINGS

Other characteristics and advantages of the invention appear on reading the following description given by way of example and made with reference to the accompanying drawings, in which.

MORE DETAILED DESCRIPTION

Figure 1:
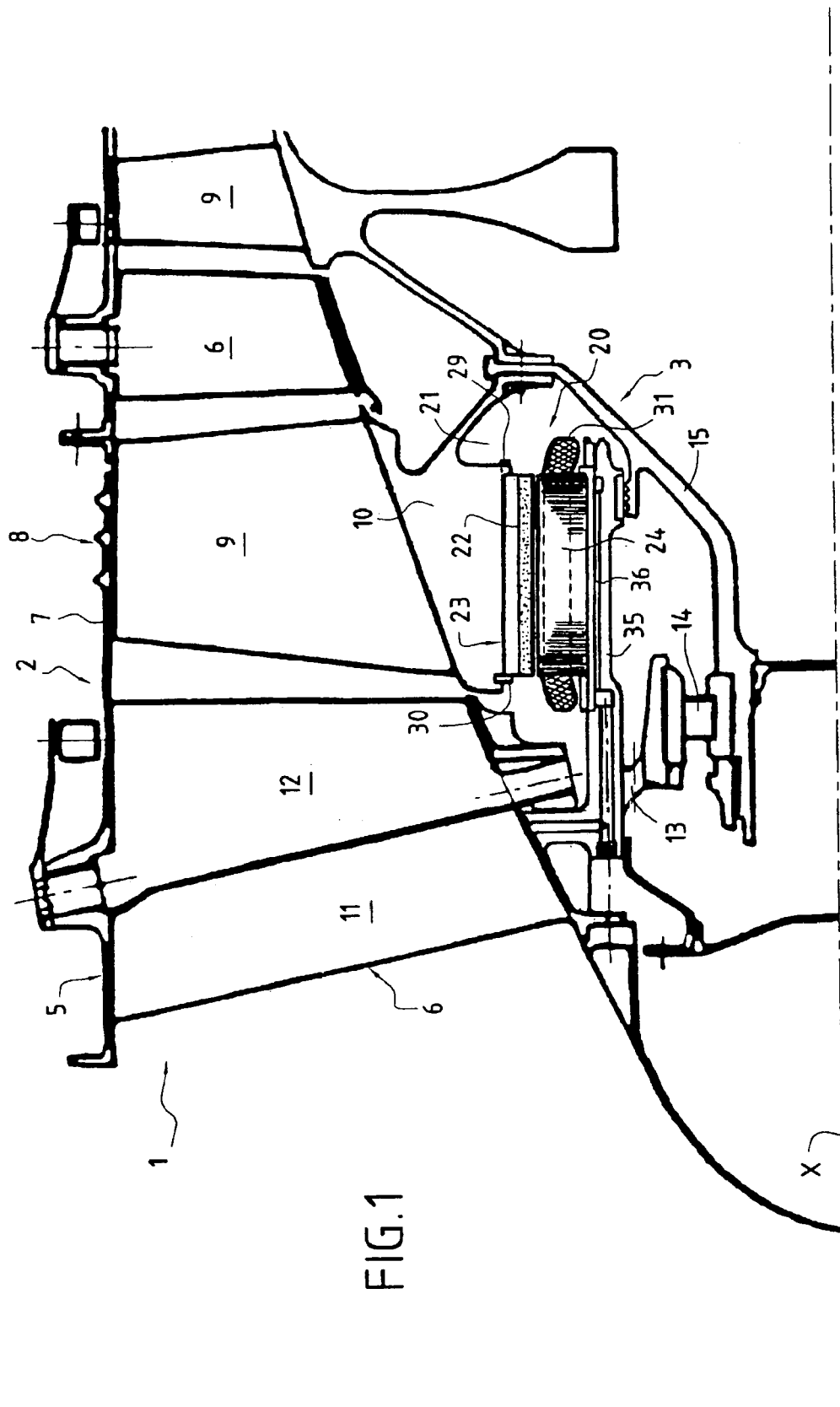
FIG. 1 is a diagrammatic half-section of the front of a single-shaft turbomachine having an inlet casing and showing the disposition of an integrated generator/starter of the invention.

FIG. 1 shows the front portion of a single-shaft turbomachine 1 with an inlet casing and comprising, in front of the combustion chamber which is not in the drawing, an axial compressor 2 of axis X, whose rotor 3 is driven by the rotor of a turbine which transforms a fraction of the energy from the hot gas delivered by the combustion chamber into work compressing the air that penetrates into the compressor 2 from the front, said compressed air being delivered into the combustion chamber where fuel is injected and burnt. The other fraction of the energy from the gases coming from the combustion chamber serve to propel the aircraft fitted with said turbomachine.

The compressor has a plurality of compression stages. Each stage comprises a ring 5 of stationary blades 6 extending radially inwards from the outer casing 7 of the engine, and a ring 8 of moving blades 9 disposed downstream from the ring 5 of stationary blades 6, and which extend radially outwards from the periphery of a disk 10 forming an element constituting the rotor 3.

The first stage of the compressor 2 shown in FIG. 1 comprises stationary blades 6 constituted in front by structural arms 11 and behind them by pivoting flaps 12 of angle that is adjusted as a function of the speed of rotation of the rotor 3 so as to improve the performance of the turbomachine. The structural arms 11 extend radially outwards from a support structure 13 for supporting the front bearing 14 of the compressor 2. The moving blades 9 of the first stage are of the large chord type, and the corresponding disk 10 is large axial dimension. The disk 10 is connected to a shroud 15 with the front bearing 14 mounted at the front end thereof.

According to the invention, a generator/starter 20 of axis X is mounted in the annular space 21 defined between the shroud 15, the support structure 13 for the bearing 14, and the disk 10 of the first stage.

The field magnetic circuit 22 of this generator/starter 20 is mounted in the inside bore 23 of the disk 10 and surrounds the secondary magnetic circuit 24 which is mounted on a cylindrical shroud 35 secured to the support structure 13 of the bearing 14.

Figure 4:
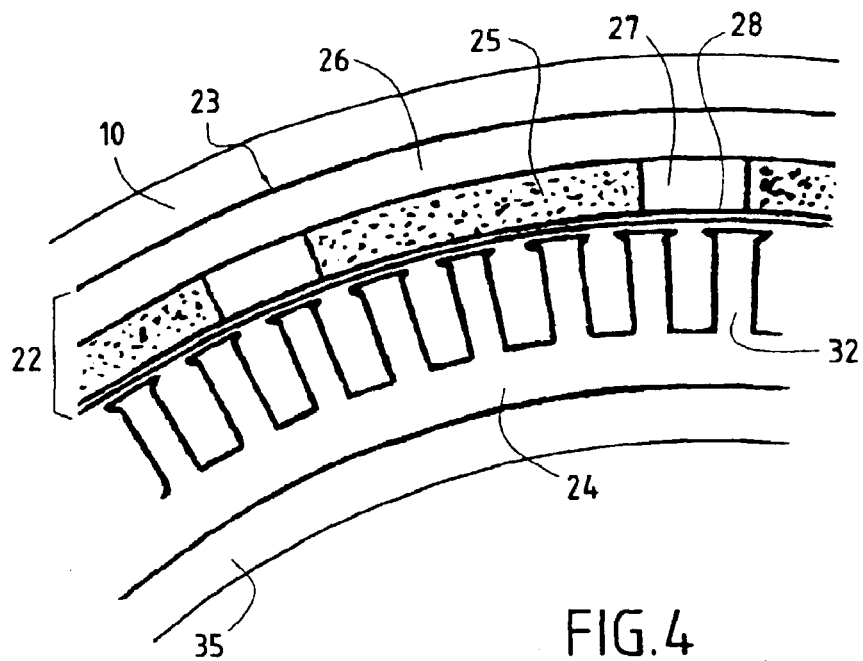
FIG. 4 is a section on a plane perpendicular to the axis of the engine through an electricity generator of the invention.

As can be seen clearly in FIG. 4, the poles of the field magnetic circuit 22 are constituted by rare earth magnets 25, e.g. made of samarium-cobalt, having characteristics that deteriorate little up to a turbomachine of 300° C., and which constitute a permanent magnetic field source. These magnets 25 are regularly distributed on the inside face of a cylindrical sleeve 26 of high resistance magnetic material, e.g. maraging steel, so as to form the field magnetic circuit of the generator/starter 20. These high energy permanent magnets 25 are not very susceptible to demagnetization and they do not generate eddy currents. They have no need for forced cooling in the environment at the front of the compressor 2. Blocks 27 of resin or aluminum are stuck between the magnets 25 in order to fill the empty space in the gap between the poles and provide the field magnetic circuit 22 with cohesion. A thin spacer 28 of non-magnetic material is secured by adhesive and an interference fit to hold the permanent magnets 25 in the cylindrical sleeve 26 and protects the active portions of the field magnetic circuit 22 in the airgap of the generator/starter 20.

The fully-equipped cylindrical sleeve 26 is placed in the bore 23 of the first stage disk 10 of the compressor 2. It is prevented from rotating by teeth or fluting 29 and it is held axially by a flexible ring 30 mounted in a groove formed in the disk 10, as can clearly be seen in FIG. 1. The cylindrical sleeve 26 provides hooping and serves to provide an interface that is suitable for mounting and dismounting the field magnetic circuit 22 in the bore 23 of the disk 10.

The thickness of the cylindrical sleeve 26 which is necessary for the purpose of closing the magnetic flux loop must be sufficient to be capable on its own of taking up the centrifugal forces developed by the permanent magnets 25 and the non-magnetic spacer 28 when the rotor 3 is rotating. The cylindrical sleeve 26 thus performs functions that are both mechanical and magnetic. The disk 10 in which the sleeve 26 is mounted nevertheless serves to distribute tangential stresses in the field magnetic circuit 22 and to reduce the radial elongation caused by such stresses so as to maintain a magnetic airgap that is small and constant.

The disk 10 of the compressor 2 is thus dimensioned to withstand the aerodynamic and centrifugal forces of the moving blades 9 and also those due to the presence of the field magnetic circuit 22 in its bore 23.

The secondary magnetic circuit 24 is constituted in conventional manner by stacks of silicon iron laminations of very small thickness for restricting eddy current flow and by windings 31 wound around the secondary poles 32 created in this way.

The secondary magnetic circuit 24 is mounted around the cylindrical shroud 35 which extends axially radially rearwards from the structure 13 for supporting the bearing 14. The diameter of the cylindrical shroud 35 is greater than the diameter of the outer ring of the bearing 14. This disposition facilitates both maintenance and dismounting of the secondary magnetic circuit 24. The structure 13 and the cylindrical shroud 35 can be provided with channels and recesses 36 which serve to allow a cooling fluid to circulate for the purpose of removing the heat that is produced, using techniques that are well known in this art.

Since the electricity delivered by the generator 20 is alternating and at a frequency that is high and variable, being proportional to the speed of the engine, all or part of thus electricity is rectified. The remainder can be used directly without an electronic interface leading to the electricity network of the aircraft fitted with a turbomachine of the invention. The generator 20 delivers electricity to all of the onboard network in the aircraft and the engine.

At the same time, there is no use of any brushes on slip rings or a commutator, thereby improving reliability and maintenance. Lightweight and reliable fuses situated outside the engine can limit the amount of electrical power generated in the event of the windings 31 short circuiting, as caused by the permanent magnet 25, so as to avoid destruction of the electrical system.

The processing of voltage and frequency can take place outside the engine in electronic units.

Figure 2:
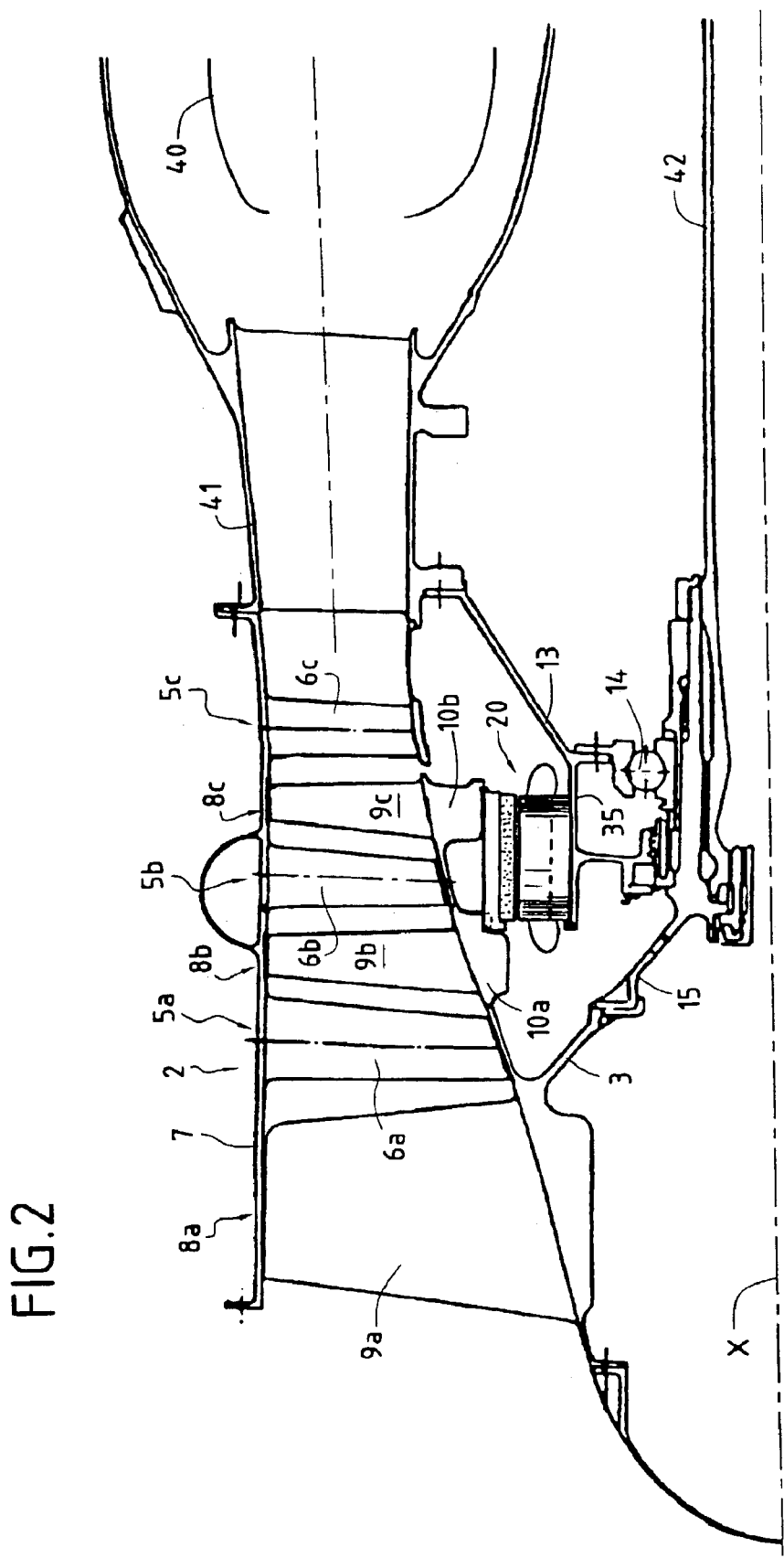
FIG. 2 is similar to FIG. 1 and shows the disposition of the generator/starter of the invention in a single-shaft turbomachine having no inlet casing.

FIG. 2 shows another type of single-shaft turbomachine, without an inlet casing, in which the compressor 2 is separated from the combustion chamber 40 by an intermediate casing 41. This intermediate casing is extended forwards by the outer casing of the compressor 2 from which there extend radially inwards three rings 5a, 5b, and 5c of stationary blades references 6a, 6b, and 6c. The rotor 3 of the compressor 2 has three rings 8a, 8b, and 8c of moving blades 9a, 9b, and 9c. In this embodiment, the ring of moving blades in each stage is disposed upstream from the ring of fixed blades of the same stage.

The rotor 3 is connected to the turbine downstream from the combustion chamber 40 by a shaft 42 of axis X connected to the rotor 3, downstream from the first ring 8a of moving blades 9a, by means of a conical shroud 15. The front end of the shaft 42 is supported by a bearing 14, itself supported by a support structure 13, likewise conical in shape and connected to the intermediate casing 41. The moving blades 9a of the first stage are of the large-chord type, whereas the moving blades 9b and 9c are of much smaller axial dimension and are mounted at the periphery of two adjacent disks 10a, 10b disposed in the annular space 21 defined by the shroud 15 and the rotor 3.

A generator/starter 20 similar to that described with reference to FIGS. 1 and 4 comprises a field magnetic circuit 22 disposed in the internal bores of two adjacent disks 10a and 10b, and a secondary magnetic circuit 24 mounted around a cylindrical shroud 35 secured to the support structure 13 for supporting the bearing 14.

Figure 3:
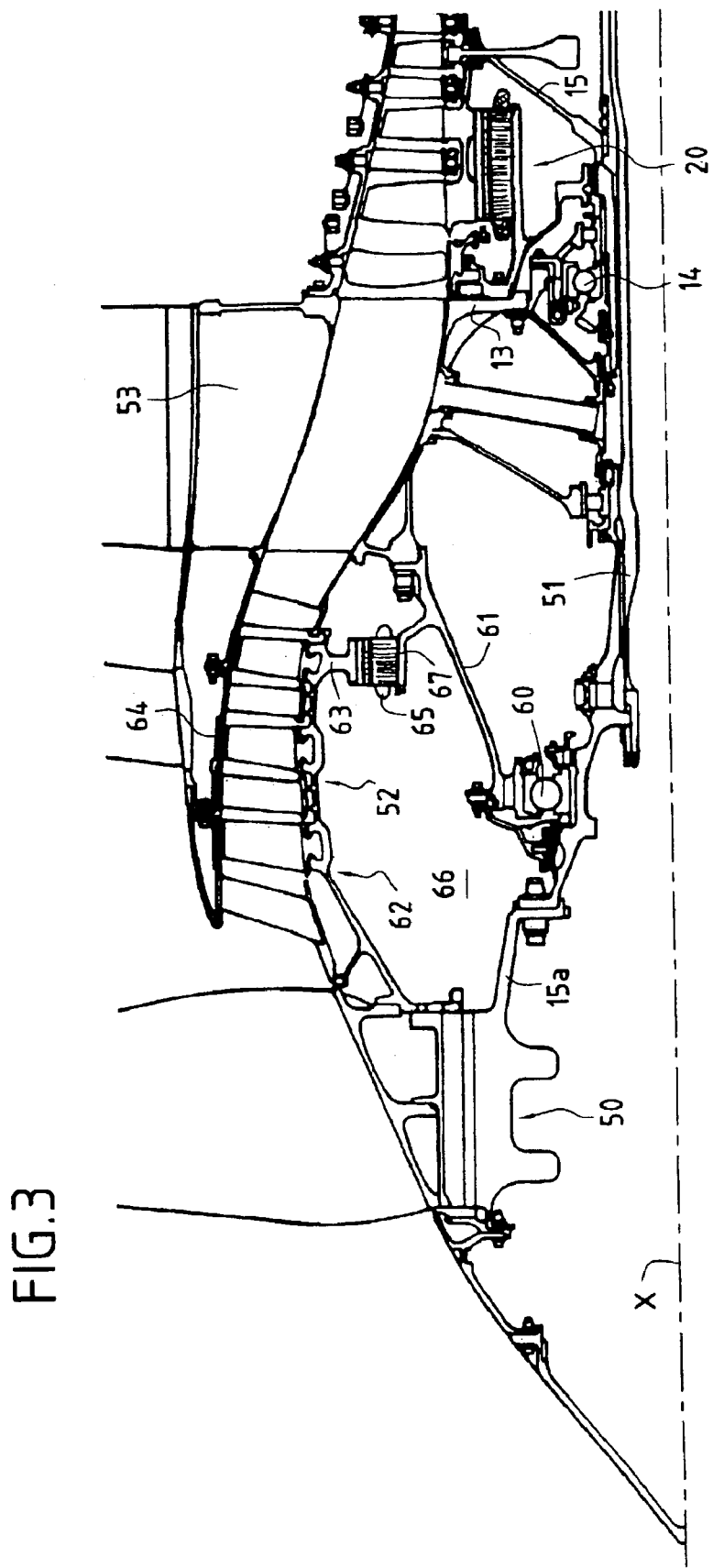
FIG. 3 is a diagrammatic half-section of a double-flow two-shaft turbomachine whose high pressure compressor is fitted with a generator/starter of the invention, and whose low pressure compressor is fitted with an accessory generator of the invention.

FIG. 3 shows the front portion of a double-flow two-shaft turbojet which comprises, from front to rear: a fan 50 driven by a low pressure shaft 51 of axis X; a low pressure compressor 52 driven by the same low pressure shaft 51, an intermediate casing 53, and a high pressure compressor 2 driven by a high pressure shaft. A bearing 14 is interposed between a support structure 13 connected to the intermediate casing 53 and the front end of the high pressure shaft.

A generator/starter 20 of axis X is integrated in the annular space 21 defined by the support structure 13, the rotor of the high pressure compressor 2, and a shroud 15 secured to the high pressure shaft.

This generator/starter is similar to that described above and does not require any further explanation.

The front end of the low pressure shaft 51 is connected to the wheel of the fan 50 by a conical shroud 15a and is supported by a front bearing 60, itself supported by a conical structure 61 connected to the intermediate casing 53. The rotor 62 of the low pressure compressor 52 is connected to the wheel of the fan 50 and is constituted by a plurality of disks 63 with rings of moving blades projecting from the peripheries thereof and interposed between rings of stationary blades secured to a front casing 64.

Figure 6:
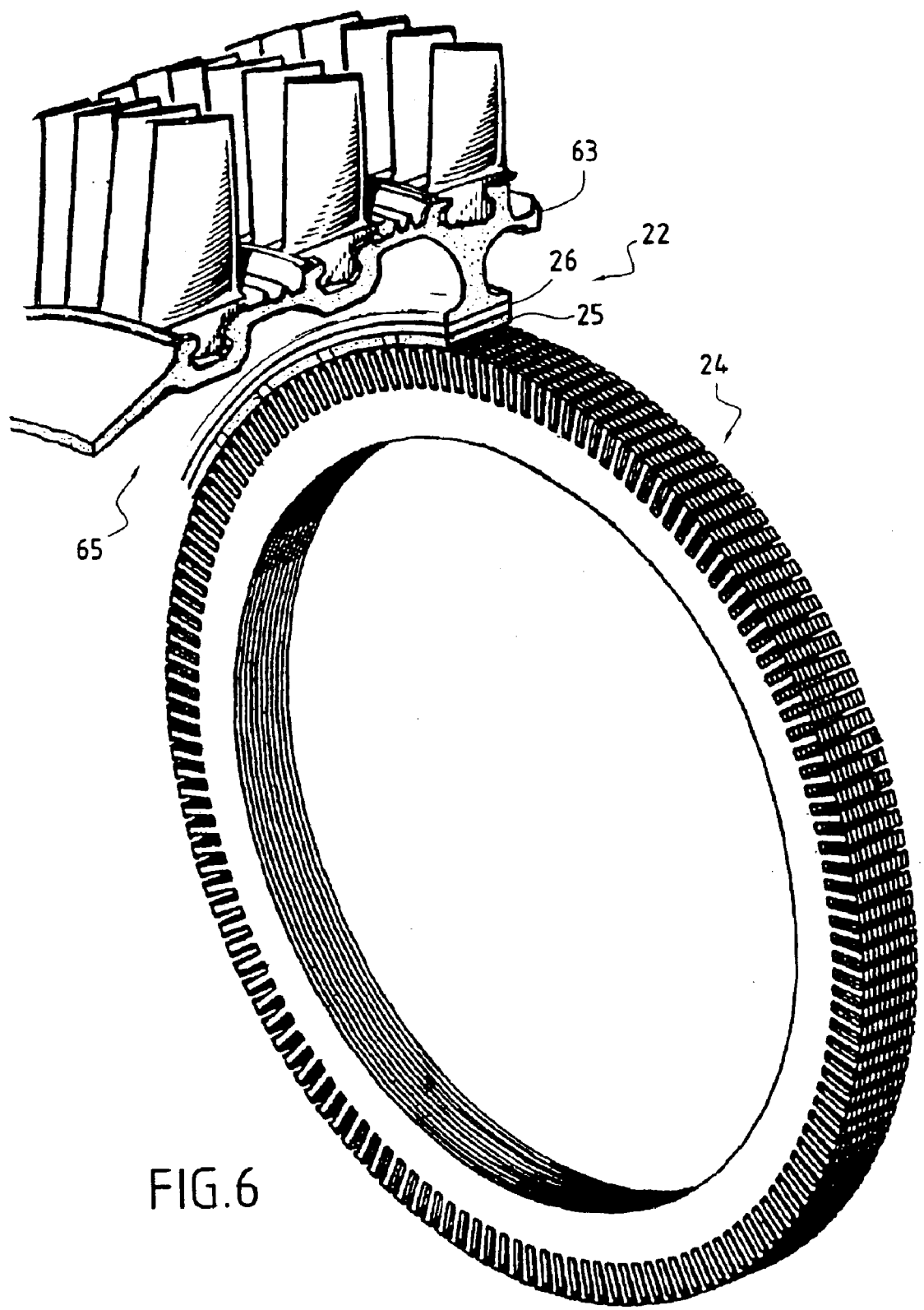
FIG. 6 is a diagrammatic section through a low pressure compressor fitted with an auxiliary generator.

According to the invention, an auxiliary generator 65 of axis X is integrated in the annular space 66 defined by the shroud 15a, the rotor 62, and the conical structure 61. This auxiliary generator 65, is shown in detail in FIG. 6, and is similar in structure to the generator/starter 20 described above. Its field magnetic circuit 22 is mounted in the bore of a disk 63 of the low pressure compressor 52, and its secondary magnetic circuit 24 is mounted around a cylindrical shroud 67 secured to the conical structure 61.

Figure 5:
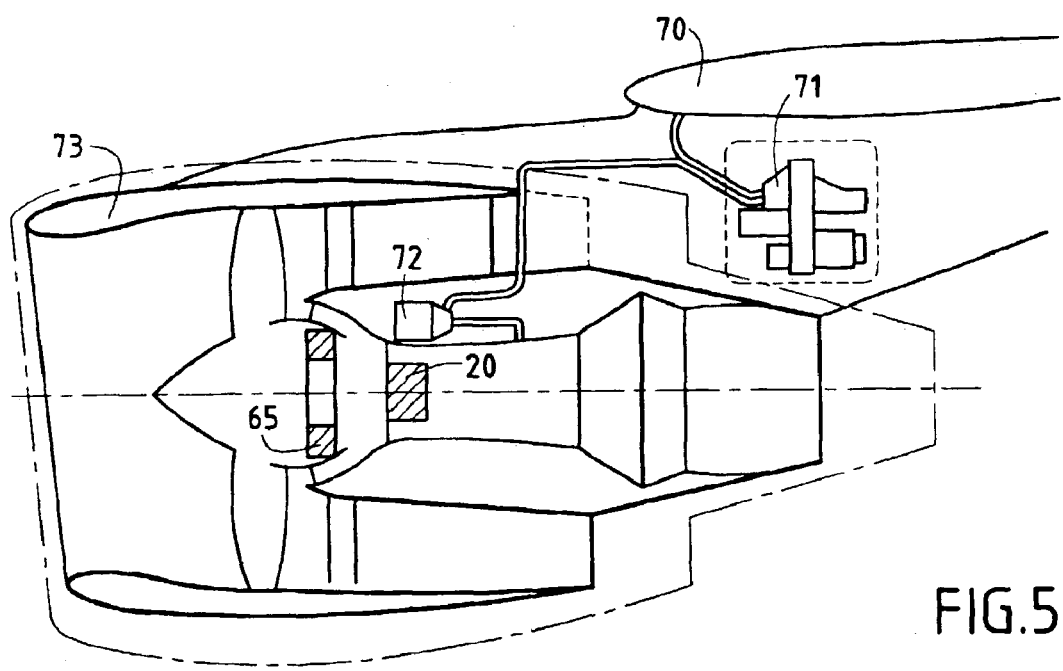
FIG. 5 shows an example of how accessories can be disposed in an "all-electric" turbojet.

FIG. 5 shows the two-shaft double-flow turbojet as described above mounted beneath the wing 70 of an airplane. The low pressure fuel pump 71 is disposed in the pylon, and the high pressure fuel pump 72 is installed in the engine casing. These two pumps 71 and 72 are driven by electric motors powered by the generator/starter 20 and optionally by the auxiliary generator 65. This "all-electric" turbojet no longer has power takeoff devices or an accessory housing disposed in the pod 73. In FIG. 5, it can be seen that the new pod 73 drawn in continuous lines is smaller in size than the pod of a conventional turbojet which is shown in chain-dotted lines.

It should be observed that adding a generator/starter 20 or an auxiliary generator 65 in the engine does not require additional bearings to be added for supporting the field or secondary magnetic circuits.

The fact that the secondary magnetic circuit is disposed inside the field magnetic circuit means that greater torque is obtained when performing the starting function for given overall size. When operating as a generator, more electricity is delivered for given size and speed since the peripheral speed of the permanent magnets and the number of magnetic poles are greater.

Finally, permanent magnet technology can be replaced by variable reluctance technology which combines a reliable rotor without windings or magnets but merely a field magnetic circuit having teeth forming poles together with high power per unit mass and good tolerance to high temperatures.

What is claimed is:

1. A turbomachine comprising a combustion chamber and a high pressure shaft, said shaft presenting upstream from said chamber an axial compressor of axis X for delivering air to said chamber, and downstream from said chamber, a turbine receiving hot gas from said chamber for rotating the rotor of said compressor, said compressor having a plurality of compression stages, each stage presenting a ring of stationary blades secured to a casing and a ring of moving blades projecting radially from the periphery of a disk of said rotor, said turbomachine further comprising an electricity generator coaxial with said body and having a field magnetic circuit constrained to rotate with said rotor and a secondary magnetic circuit secured to said casing, the field magnetic circuit being mounted in the bore of at least one disk of said compressor and surrounding the secondary magnetic circuit, and the generator being configured to operate as a starter of said turbomachine, wherein the compressor includes at least one disk carrying moving blades of large chord, and the field magnetic circuit is mounted in the bore of said disk.

2. A turbomachine comprising a combustion chamber and a high pressure shaft, said shaft presenting upstream from said chamber an axial compressor of axis X for delivering air to said chamber, and downstream from said chamber, a turbine receiving hot gas from said chamber for rotating the rotor of said compressor, said compressor having a plurality of compression stages, each stage presenting a ring of stationary blades secured to a casing and a ring of moving blades projecting radially from the periphery of a disk of said rotor, said turbomachine further comprising an electricity generator coaxial with said body and having a field magnetic circuit constrained to rotate with said rotor and a secondary magnetic circuit secured to said casing, wherein the field magnetic circuit is mounted in the bore of disks of two consecutive stages of the compressor.

3. A turbomachine according to claim 1, further comprising a low pressure shaft having a low pressure compressor disposed upstream from the high pressure shaft, and a low pressure turbine disposed downstream from the high pressure shaft for rotating the rotor of said low pressure compressor, the compressor comprising a plurality of compression stages each presenting a ring of stationary blades and a ring of moving blades which project radially from the periphery of a disk of said rotor, the turbomachine further comprising an auxiliary electricity generator having a field magnetic circuit mounted in the inside bore of at least one disk of the low pressure compressor.

4. A turbomachine according to claim 1, wherein the secondary magnetic circuit is mounted around a cylindrical shroud provided on the support structure for supporting a bearing of the corresponding compressor.

5. A turbomachine according to claim 4, wherein the cylindrical shroud is of a diameter greater than the diameter of the outer ring of the bearing.

* * * * *